United States Patent
Budampati et al.

(10) Patent No.: US 8,107,390 B2
(45) Date of Patent: Jan. 31, 2012

(54) APPARATUS AND METHOD FOR DETERMINISTIC LATENCY-CONTROLLED COMMUNICATIONS IN PROCESS CONTROL SYSTEMS

(75) Inventors: Ramakrishna S. Budampati, Maple Grove, MN (US); Arun V. Mahasenan, Kerala (IN); Soumitri N. Kolavennu, Blaine, MN (US); SrinivasaRao Katuri, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 749 days.

(21) Appl. No.: 12/176,625

(22) Filed: Jul. 21, 2008

(65) Prior Publication Data

US 2010/0014492 A1 Jan. 21, 2010

(51) Int. Cl.
*H04L 12/26* (2006.01)

(52) U.S. Cl. ...... 370/252; 370/338; 370/468; 455/452.2

(58) Field of Classification Search .......... 370/229–235, 370/252, 253, 328, 329, 338, 465, 466, 468; 455/450–452.2; 709/232, 233
See application file for complete search history.

(56) References Cited

U.S. PATENT DOCUMENTS

| | | | |
|---|---|---|---|
| 6,038,450 A * | 3/2000 | Brink et al. | 370/331 |
| 2005/0201349 A1 | 9/2005 | Budampati | |
| 2005/0281215 A1 | 12/2005 | Budampati et al. | |
| 2006/0002368 A1 | 1/2006 | Budampati et al. | |
| 2006/0171344 A1 | 8/2006 | Subramanian et al. | |
| 2006/0171346 A1 | 8/2006 | Kolavennu et al. | |
| 2006/0227729 A1 | 10/2006 | Budampati et al. | |
| 2006/0274644 A1 | 12/2006 | Budampati et al. | |
| 2006/0274671 A1 | 12/2006 | Budampati et al. | |
| 2006/0287001 A1 | 12/2006 | Budampati et al. | |
| 2007/0030816 A1 | 2/2007 | Kolavennu | |
| 2007/0030832 A1 | 2/2007 | Gonia et al. | |
| 2007/0076638 A1 | 4/2007 | Kore et al. | |
| 2007/0077941 A1 | 4/2007 | Gonia et al. | |
| 2007/0087763 A1 | 4/2007 | Budampati et al. | |
| 2007/0091824 A1 | 4/2007 | Budampati et al. | |
| 2007/0091825 A1 | 4/2007 | Budampati et al. | |
| 2007/0155423 A1 | 7/2007 | Carmody et al. | |
| 2007/0206545 A1 * | 9/2007 | Lee et al. | 370/338 |
| 2008/0267259 A1 | 10/2008 | Budampati et al. | |
| 2008/0273547 A1 | 11/2008 | Phinney | |

(Continued)

OTHER PUBLICATIONS

Dongyan Chen et al., "Dependability Enhancement for IEEE 802.11 Wireless LAN with Redundancy Techniques," Proceedings of the 2003 International Conference on Dependable Systems and Networks, 2003, 8 pages.

(Continued)

*Primary Examiner* — Pao Sinkantarakorn

(57) ABSTRACT

A method includes obtaining a data message having data associated with a process system and mapping the data message to one of multiple classifications. The method also includes wirelessly transmitting the data message, where a Quality of Service (QoS) associated with the transmission is based on the mapping. Mapping the data message could include identifying a type associated with the data message and mapping the data message based on the identified type. The type may include a publish message type, an alert message type, or a management message type. The publish message type could be mapped to an Unsolicited Grant Service (UGS) class, the alert message type could be mapped to a real-time Polling Service (rtPS) class, and the management message type could be mapped to a Best Effort (BE) or non-real-time Polling Service (nrtPS) class. A WiMAX standard could be used to transmit the message, and a WiMAX or WiFi standard could be used to obtain the message.

20 Claims, 5 Drawing Sheets

U.S. PATENT DOCUMENTS

2010/0309877 A1* 12/2010 Damnjanovic et al. ....... 370/329

OTHER PUBLICATIONS

Dr. Soumitri Kolavennu, Presentation, "WNSIA MAC Layer", ISA SP100 meeting, Feb. 14, 2007, 24 pages, see esp. p. 17.

"WiMAX", http://en.wikipedia.org/wiki/Wimax, Aug. 20, 2008, 17 pages.

Fujitsu Microelectronics America, Inc., "Fixed WiMAX Applications Focus: IP Video Surveillance Networks," 2007, 6 pages see esp. p. 3.

* cited by examiner

APPARATUS AND METHOD FOR DETERMINISTIC LATENCY-CONTROLLED COMMUNICATIONS IN PROCESS CONTROL SYSTEMS

TECHNICAL FIELD

This disclosure relates generally to wireless networks and more specifically to an apparatus and method for deterministic latency-controlled communications in process control systems.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities. Process control systems routinely include one or more wireless networks containing various wireless devices, such as wireless sensors and wireless actuators.

Often times, the wireless networks used in processing facilities are based on one or more of the IEEE 802.11 standards. While these standards are often suitable for use in monitoring systems that simply monitor industrial equipment in processing facilities, these standards are often inappropriate for use in control systems that actually control the industrial equipment. Some of the reasons include non-deterministic behavior in the Medium Access Control (MAC) layer of 802.11-based mesh networks, packet delays caused by the multi-hop nature of the mesh networks, and the lack of Quality of Service (QoS) support in the MAC layer. Among other things, this means that the delay experienced by one data packet sent through an 802.11-based mesh network can be very different from the delay experienced by another data packet traveling the same path in the network. Conventional 802.11-based mesh networks are unable to provide wireless communications where the end-to-end packet delays and packet losses are upper-bounded under varying network and channel conditions.

SUMMARY

This disclosure provides an apparatus and method for deterministic latency-controlled communications in process control systems.

In a first embodiment, a method includes obtaining a data message having data associated with a process system. The method also includes mapping the data message to one of multiple classifications. The method further includes wirelessly transmitting the data message, where a Quality of Service (QoS) associated with the transmission of the data message is based on the mapping.

In particular embodiments, wirelessly transmitting the data message includes wirelessly transmitting the data message using a WiMAX standard.

In other particular embodiments, mapping the data message includes identifying a type associated with the data message and mapping the data message based on the identified type. The type may include a publish message type, an alert message type, or a management message type. Also, multiple data messages could be obtained, mapped, and wirelessly transmitted. In addition, mapping the data messages could include mapping each publish message type to an Unsolicited Grant Service (UGS) class, each alert message type to a real-time Polling Service (rtPS) class, and each management message type to a Best Effort (BE) or non-real-time Polling Service (nrtPS) class.

In yet other particular embodiments, wirelessly transmitting the data message includes wirelessly transmitting the data message from a first wireless node to multiple second wireless nodes. The first wireless node may operate in a soft handoff mode with respect to the second wireless nodes so that the first wireless node communicates simultaneously with the second wireless nodes.

In still other particular embodiments, obtaining the data message includes wirelessly receiving the data message from a first wireless node or generating the data message at a second wireless node. If received from the first wireless node, obtaining the data message may include wirelessly receiving the data message from the first wireless node using a WiFi standard.

In additional particular embodiments, wirelessly transmitting the data message includes wirelessly transmitting the data message over a wireless backhaul link to a wired network.

In a second embodiment, an apparatus includes a wireless transceiver and a controller. The controller is configured to obtain a data message having data associated with a process system and to provide the data message to the transceiver for wireless communication. The transceiver is configured to use a WiMAX standard to communicate the data message.

In a third embodiment, a system includes multiple wireless nodes configured to communicate wirelessly. At least one of the wireless nodes includes a wireless transceiver and a controller. The controller is configured to obtain a data message having control data for controlling equipment in a process system. The controller is also configured to provide the data message to the transceiver for wireless communication. The transceiver is configured to use a WiMAX standard to communicate wirelessly and to provide a specified Quality of Service (QoS) for the control data.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
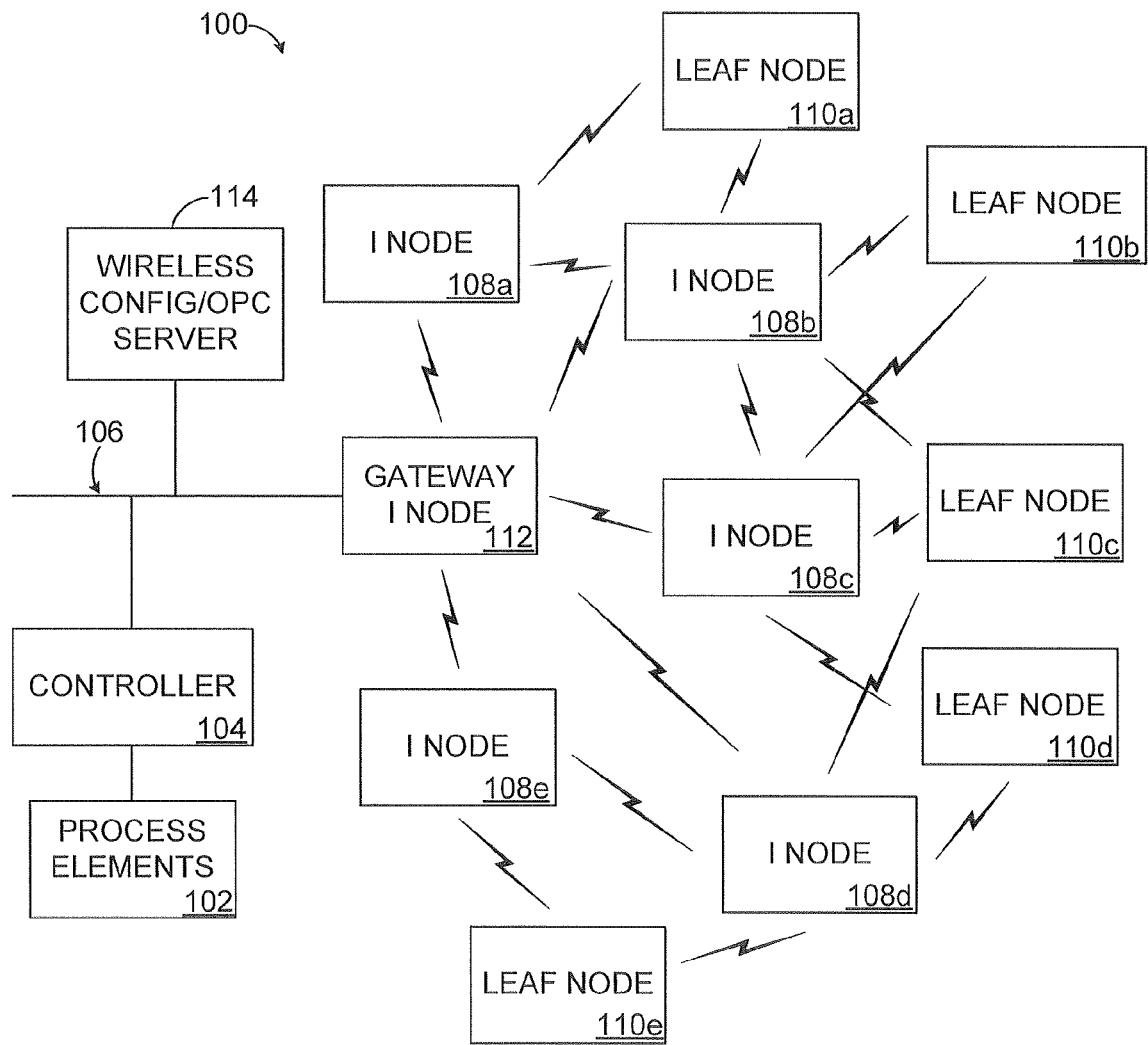
FIG. 1 illustrates an example process control system according to this disclosure.

FIG. 1 illustrates an example process control system 100 according to this disclosure. The embodiment of the process control system 100 shown in FIG. 1 is for illustration only. Other embodiments of the process control system 100 could be used without departing from the scope of this disclosure.

In this example embodiment, the process control system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations. In some embodiments, the network 106 could represent multiple networks, such as a pair of Ethernet networks or a FAULT TOLERANT ETHERNET (FTE) network from HONEYWELL INTERNATIONAL INC. (which includes a redundant pair of Ethernet networks).

In FIG. 1, the process control system 100 also includes one or more wireless networks for communicating with wireless sensors or other devices. In this example, a wireless network includes infrastructure nodes ("I nodes") 108*a*-108*e*, leaf nodes 110*a*-110*e*, and a gateway infrastructure node 112.

The infrastructure nodes 108*a*-108*e* and the leaf nodes 110*a*-110*a* engage in wireless communications with each other. For example, the infrastructure nodes 108*a*-108*e* may receive data transmitted over the network 106 (via the gateway infrastructure node 112) and wirelessly communicate the data to the leaf nodes 110*a*-110*e*. Similarly, the leaf nodes 110*a*-110*a* may wirelessly communicate data to the infrastructure nodes 108*a*-108*e* for forwarding to the network 106 (via the gateway infrastructure node 112). In addition, the infrastructure nodes 108*a*-108*e* may wirelessly exchange data with one another. In this way, the nodes 108*a*-108*e* form a wireless network capable of providing wireless coverage to leaf nodes and other devices in a specified area, such as a large industrial complex.

In this example, the nodes 108*a*-108*e* and 110*a*-110*e* are divided into infrastructure nodes and leaf nodes. The infrastructure nodes 108*a*-108*e* typically represent routing devices that can store and forward messages for other devices. Infrastructure nodes 108*a*-108*e* are typically line-powered devices, meaning these nodes receive operating power from an external source. Infrastructure nodes 108*a*-108*e* are typically not limited in their operations since they need not minimize power consumption to increase the operational life of their internal power supplies. On the other hand, leaf nodes 110*a*-110*e* typically represent devices powered by local power supplies, such as nodes that receive operating power from internal batteries or other internal power supplies. Leaf nodes 110*a*-110*e* are often more limited in their operations in order to help preserve the operational life of their internal power supplies. The leaf nodes 110*a*-110*e* typically represent non-routing devices that do not store and forward messages for other devices.

The nodes 108*a*-108*e* and 110*a*-110*e* could also include other functionality, such as functionality for generating or using data communicated over the wireless network. For example, the leaf nodes 110*a*-110*e* could represent wireless sensors used to measure various characteristics within an industrial facility. The sensors could collect and communicate sensor readings to the controller 104 via the typically represent node 112. The leaf nodes 110*a*-110*a* could also represent actuators that receive control signals from the controller 104 and adjust the operation of the industrial facility. In this way, the leaf nodes may include or operate in a similar manner as the process elements 102 physically connected to the controller 104. The leaf nodes 110*a*-110*e* could further represent handheld user devices (such as INTELATPAC devices from HONEYWELL INTERNATIONAL INC.), mobile stations, programmable logic controllers, or any other or additional devices. The infrastructure nodes 108*a*-108*e* may also include any of the functionality of the leaf nodes 110*a*-110*e* or the controller 104.

The gateway infrastructure node 112 communicates wirelessly with, transmits data to, and receives data from one or more infrastructure nodes and possibly one or more leaf nodes. The gateway infrastructure node 112 may convert data between protocol(s) used by the network 106 and protocol(s) used by the nodes 108*a*-108*e* and 110*a*-110*e*. For example, the gateway infrastructure node 112 could convert Ethernet-formatted data transported over the network 106 into a wireless protocol format used by the nodes 108*a*-108*e* and 110*a*-110*e*. The gateway infrastructure node 112 could also convert data received from one or more of the nodes 108*a*-108*e* and 110*a*-110*e* into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

In particular embodiments, the various nodes in the wireless network of FIG. 1 form a mesh network communicating at 2.4 GHz or 5.8 GHz. Also, in particular embodiments, data can be injected into the wireless mesh network through the infrastructure nodes or leaf nodes, thus providing versatile, multifunctional, plant-wide coverage for wireless sensing, asset location tracking, personnel tracking, wireless communications, and any other or additional functionality as desired.

A wireless configuration and OLE for Process Control (OPC) server 114 can configure and control various aspects of the process control system 100. For example, the server 114 could configure the operation of the nodes 108*a*-108*e*, 110*a*-110*e*, and 112. The server 114 could also support security in the process control system 100, such as by distributing cryptographic keys or other security data to various components in the process control system 100 (like the nodes 108*a*-108*e*, 110*a*-110*e*, and 112). The server 114 includes any hardware, software, firmware, or combination thereof for configuring wireless networks and providing security information.

In one aspect of operation, to provide more deterministic latency-controlled behavior in the wireless network, one or more of the nodes 108a-108e, 110a-110e, 112 support the use of the IEEE 802.16 standard (referred to as a "WiMAX standard") or other standard that supports Quality of Service (QoS) parameters. For example, in some embodiments, the leaf nodes 110a-110e communicate with the infrastructure nodes 108a-108e using a low-power IEEE 802.11 standard (referred to as a "WiFi standard"), and the infrastructure nodes 108a-108e may communicate with each other and with the gateway infrastructure node 112 using a WiMAX or similar standard. In particular embodiments, the infrastructure nodes 108a-108e may operate as WiMAX subscriber stations, while the gateway infrastructure node 112 may operate as a WiMAX base station.

In other embodiments, the leaf nodes 110a-110e may communicate with the infrastructure nodes 108a-108e using a WiMAX or similar standard, and the infrastructure nodes 108a-108e may communicate with each other and with the gateway infrastructure node 112 using a WiMAX or similar standard. In particular embodiments, the leaf nodes 110a-110e may operate as WiMAX subscriber stations, while the infrastructure nodes 108a-108e and the gateway infrastructure node 112 may operate as WiMAX base stations.

In yet other embodiments, the leaf nodes 110a-110e may communicate with the infrastructure nodes 108a-108e using a WiFi standard, and the infrastructure nodes 108a-108e may communicate with each other using a WiFi standard. Also, the gateway infrastructure node 112 may communicate over a "backhaul" or other wireless communication link using a WiMAX or similar standard.

These embodiments are for illustration only and represent three example ways that WiMAX could be used in the process control system 100. Additional details regarding this functionality are provided below. Also provided below are details regarding the mapping of data to support QoS functions in the wireless network. In addition, one example embodiment of the various wireless nodes 108a-108e, 110a-110e, 112 is shown in FIG. 2, which is described below.

Although FIG. 1 illustrates one example of a process control system 100, various changes may be made to FIG. 1. For example, the process control system 100 could include any number of process elements, controllers, networks (wired or wireless), infrastructure nodes (gateway or other), leaf nodes, and servers. Also, the functional division shown in FIG. 1 is for illustration only. Various components in FIG. 1 could be combined, subdivided, or omitted and additional components could be added according to particular needs. In addition, FIG. 1 illustrates one example operational environment where deterministic latency-controlled networks could be used. This functionality could be used with any suitable device or system.

Figure 2:
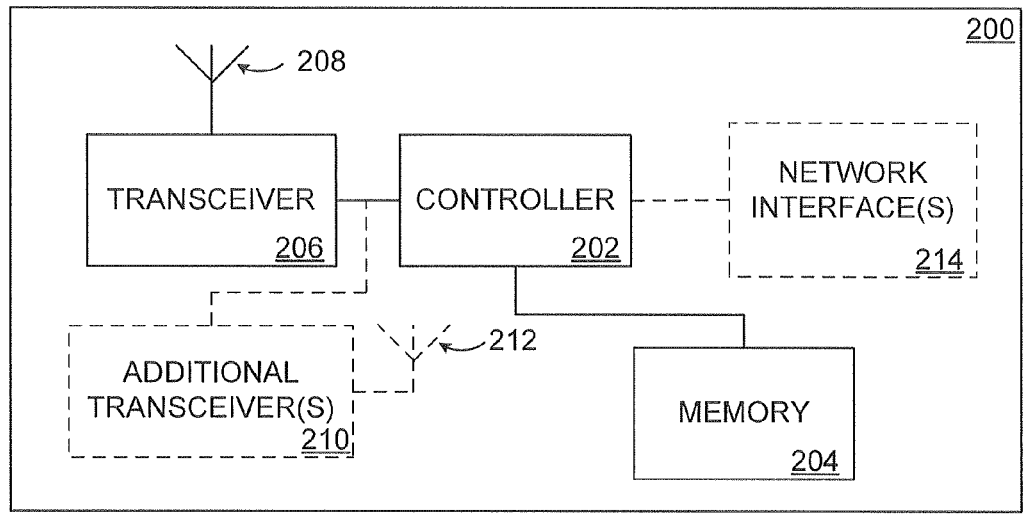
FIG. 2 illustrates an example wireless node in a wireless network according to this disclosure.

FIG. 2 illustrates an example wireless node 200 in a wireless network according to this disclosure. The wireless node 200 could, for example, represent a leaf node, infrastructure node, or gateway infrastructure node in the system 100 of FIG. 1. The embodiment of the wireless node 200 shown in FIG. 2 is for illustration only. Other embodiments of the wireless node 200 could be used without departing from the scope of this disclosure.

As shown here, the node 200 includes a controller 202, which controls the overall operation of the node 200. For example, the controller 202 may receive or generate data to be transmitted, and the controller 202 could provide the data to other component(s) in the node 200 for transmission over a wired or wireless network. The controller 202 could also receive data over a wired or wireless network and use or forward the data. As a particular example, the controller 202 in a sensor leaf node could provide sensor data for transmission, and the controller 202 in an actuator leaf node could receive and implement control signals (the leaf node could represent a combined sensor-actuator device). As another example, the controller 202 in an infrastructure node could receive data transmitted wirelessly, determine a next hop for the data (if any), and provide the data for transmission to the next hop (if any). As a third example, the controller 202 in a gateway infrastructure node 112 could receive data from a wired network and provide the data for wireless transmission (or vice versa). The controller 202 includes any hardware, software, firmware, or combination thereof for controlling operation of the node 200. As particular examples, the controller 202 could represent a processor, microprocessor, microcontroller, field programmable gate array, or other processing or control device.

A memory 204 is coupled to the controller 202. The memory 204 stores any of a wide variety of information used, collected, or generated by the node 200. For example, the memory 204 could store information received over a network that is to be transmitted over the same or other network. The memory 204 includes any suitable volatile and/or non-volatile storage and retrieval device(s).

The node 200 also includes a wireless transceiver 206 coupled to an antenna 208. The transceiver 206 and antenna 208 can be used to communicate wirelessly with other devices. For example, in a leaf node, the transceiver 206 and antenna 208 can be used to communicate with infrastructure nodes. In an infrastructure or gateway infrastructure node, the transceiver 206 and antenna 208 can be used to communicate with leaf nodes or other infrastructure nodes. One or more additional transceivers 210 could also be used in the node 200. For instance, in an infrastructure or gateway infrastructure node, the additional transceiver(s) 210 could be used to communicate with WiFi or IEEE 802.11 devices (such as wireless controllers or hand-held user devices) or other infrastructure or gateway infrastructure nodes. The additional transceivers 210 may be coupled to their own antennas 212 or share one or more common antennas (such as antenna 208). Each transceiver includes any suitable structure for transmitting and/or receiving wireless signals. In some embodiments, each transceiver represents a radio frequency (RF) transceiver, and each antenna could represent an RF antenna. Each transceiver could also include a transmitter and a separate receiver.

If the node 200 represents a gateway infrastructure node, the node 200 may further include one or more wired network interfaces 214. The network interfaces 214 allow the node 200 to communicate over one or more wired networks, such as the network 106 (as shown in FIG. 1). Each network interface 214 includes any suitable structure for transmitting and/or receiving signals over a wired network, such as an Ethernet interface.

The actual standard or protocol used by the wireless node 200 to communicate may depend on the embodiment of the wireless network. For example, as noted above, in various embodiments, leaf nodes 110a-110e may communicate using a WiFi, WiMAX, or other standard (such as the IEEE 802.15.4 standard or a narrow-band frequency-hopping standard). If communicating using a WiFi standard, the leaf node could include an RF transceiver 206, such as an RF IEEE 802.11 or 802.15.4 transceiver. If communicating using a WiMAX standard, the leaf node could include an RF transceiver 206 appearing as a WiMAX subscriber station.

Infrastructure nodes 110a-110e may also communicate using one or more WiFi, WiMAX, or other standards. For example, if an infrastructure node communicates with leaf nodes using a WiFi standard, the infrastructure node could include an RF IEEE 802.11 or 802.15.4 transceiver 206. If an infrastructure node communicates with leaf nodes using a WiMAX standard, the infrastructure node could include an RF transceiver 206 appearing as a WiMAX base station. Similarly, if an infrastructure node communicates with other infrastructure nodes or a gateway infrastructure node using a WiFi standard, the infrastructure node could include an RF IEEE 802.11 or 802.15.4 transceiver 210. If an infrastructure node communicates with other infrastructure nodes or a gateway infrastructure node using a WiMAX standard, the infrastructure node could include an RF transceiver 210 appearing as a WiMAX subscriber station.

A gateway infrastructure node 112 could use an RF IEEE 802.11 or 802.15.4 transceiver 210 to communicate with infrastructure nodes 108a-108e using a WiFi standard. The gateway infrastructure node 112 could also use an RF transceiver 210 appearing as a WiMAX base station to communicate with infrastructure nodes 108a-108e using a WiMAX standard. The gateway infrastructure node 112 could further use an RF transceiver 210 to communicate over a backhaul or other link using a WiMAX standard.

Figure 3A:
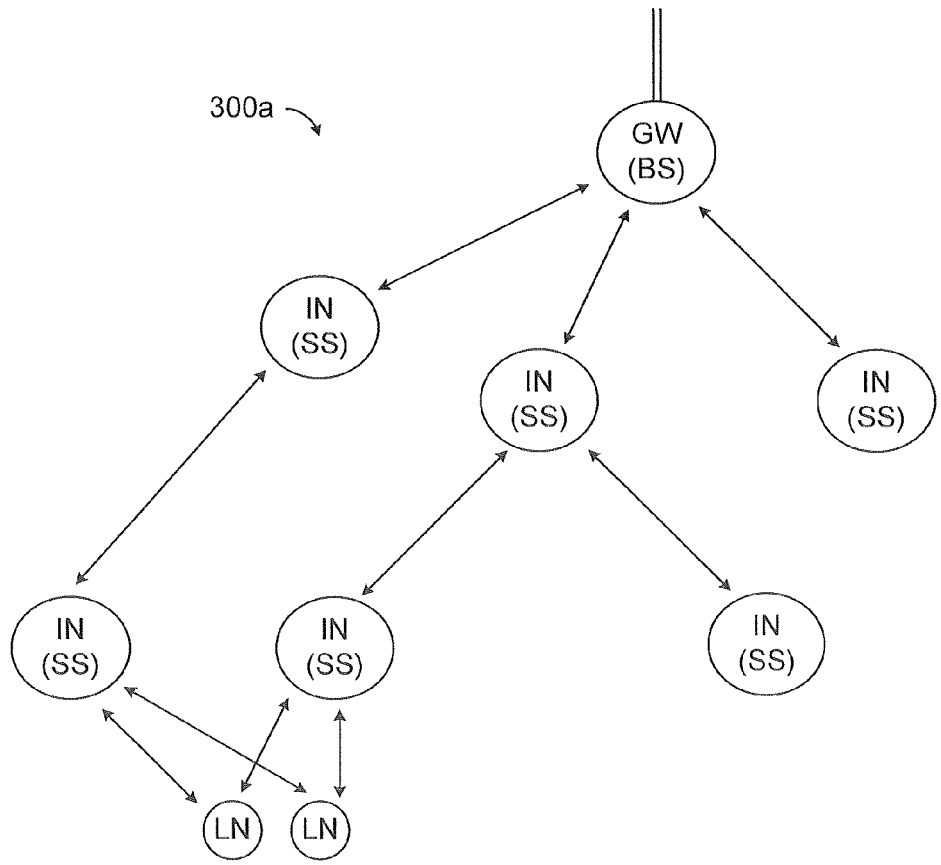
FIGS. 3A through 3C illustrate example configurations of a wireless network according to this disclosure.
Figure 3B:
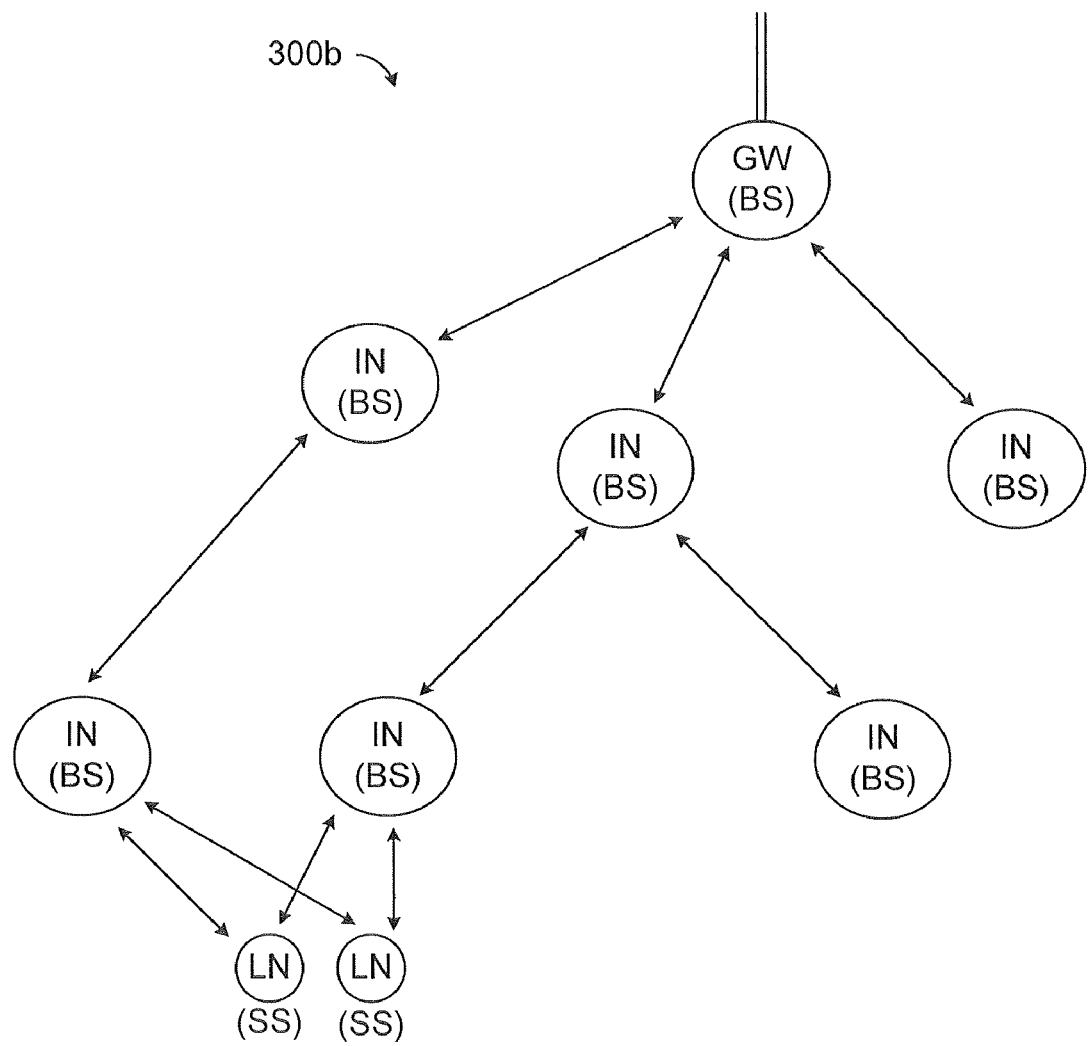
Figure 3C:
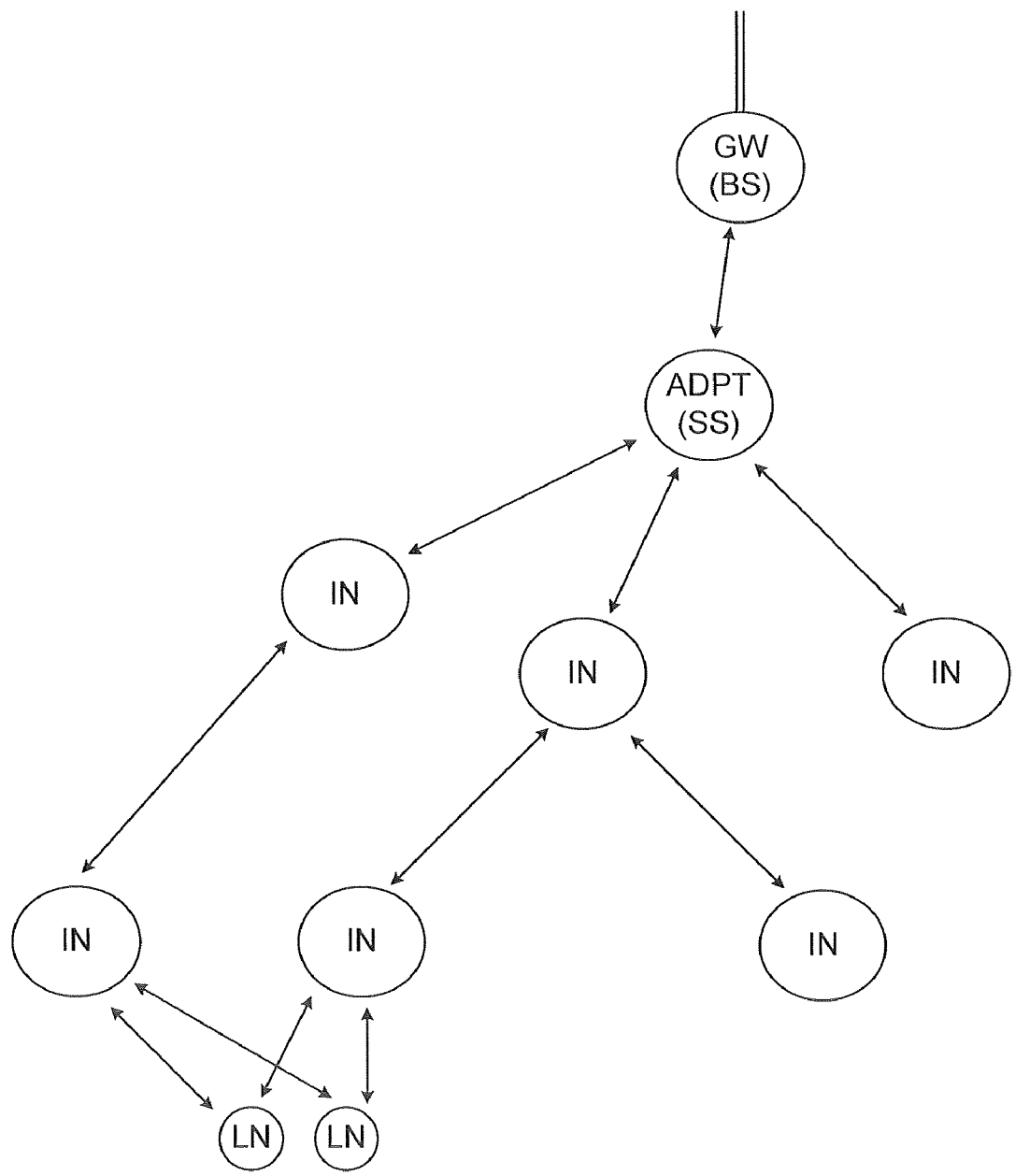

In some embodiments, the particular choice of transceiver(s) for the wireless node 200 may depend on (i) whether the node 200 is a leaf, infrastructure, or gateway infrastructure node and/or (ii) the configuration of the wireless network. Example network configurations are shown in FIGS. 3A through 3C, which are described below. Also, any suitable frequency spectrum could be used to support WiMAX or other communications, including licensed or unlicensed frequencies.

Although FIG. 2 illustrates one example of a wireless node 200 in a wireless network, various changes may be made to FIG. 2. For example, various components in FIG. 2 could be combined, subdivided, or omitted and additional components could be added according to particular needs. Also, a "wireless node" represents any device that can transmit and/or receive data wirelessly, even if the "wireless node" has the ability to transmit and/or receive data over a wired connection as well.

FIGS. 3A through 3C illustrate example configurations of a wireless network according to this disclosure. The configurations shown in FIGS. 3A through 3C could, for example, be used in the process control system 100 of FIG. 1. The embodiments of the configurations shown in FIGS. 3A through 3C are for illustration only. Other wireless network configurations could be used without departing from the scope of this disclosure.

As shown in FIG. 3A, a wireless network configuration 300a includes two leaf nodes (LNs), each of which communicates with a redundant pair of infrastructure nodes (INs). Communications between the leaf nodes and their redundant pair of infrastructure nodes may occur using a WiFi standard. The infrastructure nodes in this example may communicate with each other and with a gateway infrastructure node (GW) using a WiMAX standard. In this example, the leaf nodes and the infrastructure nodes have transceivers 206 that support WiFi communications. The infrastructure nodes and gateway infrastructure node also have transceivers 210 that support WiMAX communications. The transceivers 210 in the infrastructure nodes operate as subscriber stations (SS), while the transceiver 210 in the gateway infrastructure node operates as a base station (BS).

Note that each of the subscriber stations (the infrastructure nodes) could be in direct communication with the gateway infrastructure node (single hop) or in indirect communication with the gateway infrastructure node through other subscriber stations (multi-hop). The multi-hop configuration may or may not involve the use of mesh network functionality. Also note that the gateway infrastructure node is coupled to a pair of networks (network 106), such as a pair of Ethernet networks or an FTE network.

As shown in FIG. 3B, a wireless network configuration 300b again includes two leaf nodes, each communicating with a redundant pair of infrastructure nodes. These communications may occur using a WiMAX standard. The infrastructure nodes may communicate with each other and with a gateway infrastructure node also using a WiMAX standard. Here, the leaf nodes and the infrastructure nodes have transceivers 206 that support WiMAX communications, and the infrastructure nodes and gateway infrastructure node have transceivers 210 that support WiMAX communications. The WiMAX transceivers in the leaf nodes operate as subscriber stations, while the infrastructure nodes include WiMAX transceivers operating as base stations.

Note that the WiMAX standard does not typically support redundant communications (from a leaf node to two or more infrastructure nodes) in normal operation. However, the WiMAX standard does support the use of "soft handoffs," which ordinarily occur when a subscriber station moves from an area served by one base station into an area served by another base station. During a normal "soft handoff," the subscriber station continues to communicate with both the old and new base stations until a handoff is completed, at which point the subscriber station communicates with the new base station. In FIG. 3B, each leaf node communicating with multiple infrastructure nodes could be permanently placed in the "soft handoff" mode, allowing the leaf node to communicate with the multiple infrastructure nodes at the same time.

As shown in FIG. 3C, a wireless network configuration 300c again includes two leaf nodes, each communicating with a redundant pair of infrastructure nodes. These communications may occur using a WiFi standard. The infrastructure nodes may communicate with each other and with an adapter (ADPT) also using a WiFi standard. Here, the leaf nodes and the infrastructure nodes have transceivers 206 that support WiFi communications, and the infrastructure nodes have transceivers 210 that support WiFi communications. The adapter represents a WiFi-to-WiMAX adapter that supports WiMAX communications over a backhaul link with the gateway infrastructure node. The gateway infrastructure node has a transceiver 210 that supports WiMAX communications over the backhaul link. The adapter could represent an infrastructure node that supports the use of WiMAX (while the other infrastructure nodes may lack that functionality). The adapter could also represent a modified infrastructure node that, for example, lacks the transceiver 206 and antenna 208 for communicating with leaf nodes. In this configuration, the adapter functions as a WiMAX subscriber station, while the gateway infrastructure node functions as a WiMAX base station.

In any of these embodiments, WiMAX communications could occur using any suitable type of network. For example, the WiMAX communications could involve the use of a time division multiple access (TDMA) mesh network. The WiMAX TDMA mesh network could be formed, for instance, in FIG. 3A or FIG. 3B by the infrastructure nodes and the gateway infrastructure node.

Moreover, nodes supporting WiMAX communications can engage in data mapping to classify data being sent to or from leaf nodes into appropriate classes, which can be used to support QoS functions. For example, publish data messages (such as messages containing sensor readings or other data used for monitoring) could be mapped as "Unsolicited Grant Service" (UGS) WiMAX messages. Publish messages typically represent messages made available to other nodes for informational, monitoring, or other purposes. Publish messages are often generated or made available periodically (at a specified interval) and often contain time-critical data. Alert messages (such as messages identifying problems in a process control system) could be mapped as real-time Polling Service (rtPS) WiMAX messages. Alert messages are often generated a-periodically and may contain time-critical data. Management messages (such as messages used to control industrial equipment) could be mapped as "Best Effort" (BE) or non-real-time Polling Service (nrtPS) WiMAX messages. Management messages often contain lower-priority data that is not time sensitive. In this way, different types of messages can be classified and receive an appropriate QoS in the WiMAX network based on whether the messages are related to monitoring (less important) or control (more important).

Further, a node operating as a WiMAX base station can assign one or more communication channels to WiMAX subscriber stations. For example, a WiMAX base station could monitor the interference present on a particular channel (such as a particular time slot and/or frequency). The WiMAX base station could also receive an indication of the bandwidth required for a subscriber station (such as from a user or from the subscriber station). Using one or more of these or other factors, the WiMAX base station can assign a suitable channel to each of the WiMAX subscriber stations communicating with that WiMAX base station.

These represent merely three examples of the various ways in which WiFi, WiMAX, and other standards could be used in the wireless network of a process control system. Any other suitable configuration could be used. For example, a configuration could include leaf node-infrastructure node communications involving:

802.15.4 communications (the infrastructure node could operate as a WiMAX base or subscriber station, and redundant infrastructure nodes could be used);

frequency hopping spread spectrum (FHSS) communications (where the infrastructure node could operate as a WiMAX base or subscriber station, and redundant infrastructure nodes could be used); or WiMAX communications (where the infrastructure node could operate as a WiMAX base station, and redundant infrastructure nodes could be used with the leaf node operating in soft handoff mode).

Similarly, a configuration could also include infrastructure node-gateway infrastructure node communications involving:

a subscriber station infrastructure node communicating with a base station gateway infrastructure node;

a subscriber station infrastructure node communicating with a redundant pair of base station gateway infrastructure nodes (with the subscriber station infrastructure node operating in soft handoff mode);

base station infrastructure nodes and base station gateway infrastructure nodes operating in a multi-hop network;

subscriber station infrastructure nodes and subscriber station gateway infrastructure nodes operating in a multi-hop network;

subscriber station infrastructure nodes using WiMAX to communicate with a service provider's base station, which is coupled to the gateway infrastructure node via a backhaul network; and infrastructure nodes using WiFi to communicate with an adapter, which is coupled to the gateway infrastructure node via a backhaul network.

These examples are for illustration only.

Although FIGS. 3A through 3C illustrate examples of wireless network configurations, various changes may be made to FIGS. 3A through 3C. For example, other wireless network configurations could be used. Also, features of different configurations could be combined and used at the same time in a wireless network. As a particular example, either of the configurations 300a-300b could include the WiMAX backhaul link from the configuration 300c.

Figure 4:
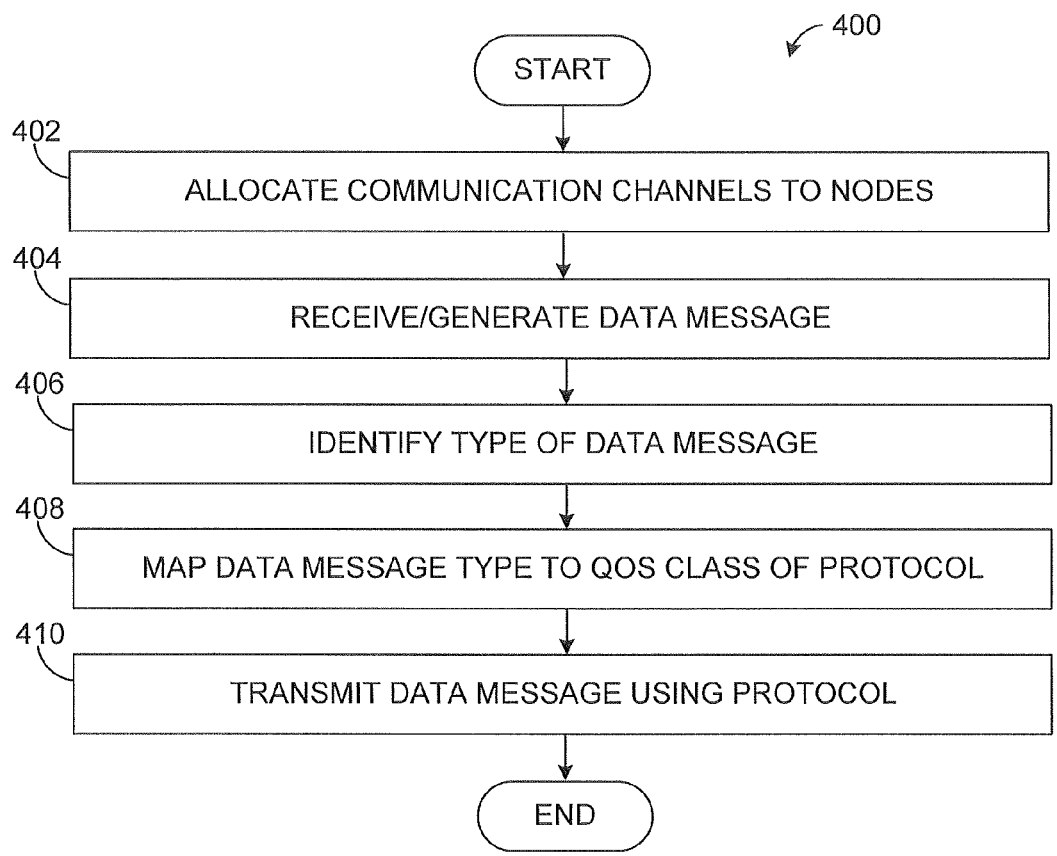
FIG. 4 illustrates an example method for deterministic latency-controlled communications according to this disclosure.

FIG. 4 illustrates an example method 400 for deterministic latency-controlled communications according to this disclosure. The embodiment of the method 400 shown in FIG. 4 is for illustration only. Other embodiments of the method 400 could be used without departing from the scope of this disclosure.

A node allocates communication channels to one or more other nodes in a wireless network at step 402. This could include, for example, a first node assigning a particular channel (such as a time slot) to a second node based on the channel's interference and/or the bandwidth required by the second node. Note that any suitable node could be responsible for allocating channels, such as a WiMAX base station or a WiFi node.

The node receives or generates a data message to be transmitted at step 404. This could include, for example, an infrastructure node receiving a message from a leaf node, or a gateway infrastructure node receiving a message from an infrastructure node. This could also include a leaf node generating a data message for transmission to an infrastructure node.

A type associated with the data message is identified at step 406. This could include, for example, the controller 202 in the node determining if the data message represents a publish message, an alert message, or a management message. The data message is then mapped to a QoS class of a specified protocol at step 408. This could include, for example, the controller 202 in the node mapping publish messages to a UGS class, alert messages to a rtPS class, and management messages to a BE or nrtPS class of the WiMAX protocol.

The data message is then transmitted at step 410. This could include, for example, the node transmitting the message using QoS parameters associated with the QoS class to which the data message was mapped. In this way, the node in a process control system (whether it is a leaf, infrastructure, or gateway infrastructure node) can use WiMAX or another standard supporting QoS in a wireless network to provide for both the monitoring and control of an industrial process.

Although FIG. 4 illustrates one example of a method 400 for deterministic latency-controlled communications, various changes may be made to FIG. 4. For example, while shown as a series of steps, various steps in FIG. 4 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining multiple data messages, each data message comprising data associated with a process system and having a data message type comprising one of: a publish message type, an alert message type, and a management message type;
   mapping each of the data messages to one of multiple classifications based on the data message type of that data message; and
   wirelessly transmitting the data messages, wherein a Quality of Service (QoS) associated with the transmission of each data message is based on the classification of that data message;
   wherein mapping each of the data messages comprises mapping each data message of the publish message type to an Unsolicited Grant Service (UGS) class, mapping each data message of the alert message type to a real-time Polling Service (rtPS) class, and mapping each data message of the management message type to a Best Effort (BE) or non-real-time Polling Service (nrtPS) class.

2. The method of claim 1, wherein wirelessly transmitting the data messages comprises wirelessly transmitting the data messages using a WiMAX standard.

3. The method of claim 1, wherein wirelessly transmitting the data messages comprises wirelessly transmitting the data messages from a first wireless node to multiple second wireless nodes.

4. The method of claim 3, wherein the first wireless node operates in a soft handoff mode with respect to the second wireless nodes so that the first wireless node communicates simultaneously with the second wireless nodes.

5. The method of claim 1, wherein obtaining the data messages comprises at least one of:
   wirelessly receiving one or more of the data messages from a first wireless node; and
   generating one or more of the data messages at a second wireless node.

6. The method of claim 1, wherein obtaining the data messages comprises wirelessly receiving one or more of the data message using a WiFi standard.

7. The method of claim 1, wherein wirelessly transmitting the data messages comprises wirelessly transmitting the data messages over a wireless backhaul link to a gateway coupled to a wired network.

8. An apparatus comprising:
   a wireless transceiver; and
   a controller configured to:
      obtain multiple data messages, each data message comprising data associated with a process system and having a data message type comprising one of: a publish message type, an alert message type, and a management message type;
      map each of the data messages to one of multiple classifications based on the data message type of that data message; and
      provide the data messages to the transceiver for wireless communication, wherein a Quality of Service (QoS) associated with the transmission of each data message is based on the classification of that data message;
   wherein the transceiver is configured to use a WiMAX standard to communicate the data messages; and
   wherein the controller is configured to map each of the data messages by mapping each data message of the publish message type to an Unsolicited Grant Service (UGS) class, mapping each data message of the alert message type to a real-time Polling Service (rtPS) class, and mapping each data message of the management message type to a Best Effort (BE) or non-real-time Polling Service (nrtPS) class.

9. The apparatus of claim 8, wherein:
   the controller is configured to obtain the data messages by generating one or more of the data messages; and
   the transceiver is configured to operate as a WiMAX subscriber station that is configured to communicate with one or more WiMAX base stations.

10. The apparatus of claim 8, wherein the controller is configured to obtain the data messages by receiving one or more of the data messages using the transceiver or a second transceiver.

11. The apparatus of claim 10, wherein the transceiver or the second transceiver is configured to use a WiFi standard to receive one or more of the data messages.

12. The apparatus of claim 10, wherein the transceiver or the second transceiver is configured to operate as a WiMAX base station that is configured to communicate with a WiMAX subscriber station.

13. The apparatus of claim 8, wherein the controller is configured to operate in a soft handoff mode with respect to multiple WiMAX base stations that are configured to receive the transmitted data messages.

14. A system comprising multiple wireless nodes configured to communicate wirelessly, at least one of the wireless nodes comprising:
   a wireless transceiver; and
   a controller configured to:
      obtain multiple data messages, each data message comprising data associated with a process system and having a data message type comprising one of: a publish message type, an alert message type, and a management message type;

map each of the data messages to one of multiple classifications based on the data message type of that data message; and provide the data messages to the transceiver for wireless communication, wherein a Quality of Service (QoS) associated with the transmission of each data message is based on the classification of that data message;

wherein the transceiver is configured to use a WiMAX standard to communicate the data messages; and wherein the controller is configured to map each of the data messages by mapping each data message of the publish message type to an Unsolicited Grant Service (UGS) class, mapping each data message of the alert message type to a real-time Polling Service (rtPS) class, and mapping each data message of the management message type to a Best Effort (BE) or non-real-time Polling Service (nrtPS) class.

15. The system of claim 14, wherein:

the controller is configured to initiate transmission of the data messages to multiple WiMAX base stations; and the controller is configured to operate in a soft handoff mode with respect to the WiMAX base stations.

16. The system of claim 14, wherein the transceiver or a second transceiver is configured to operate as a WiMAX base station that is configured to communicate with a WiMAX subscriber station.

17. A non-transitory tangible computer readable storage medium embodying a computer program, the computer program comprising computer readable program code for:

mapping each of multiple data messages to one of multiple classifications based on a data message type of that data message, each data message comprising data associated with a process system, the data message type of each data message comprising one of: a publish message type, an alert message type, and a management message type; and initiating wireless transmission of the data messages, wherein a Quality of Service (QoS) associated with the transmission of each data message is based on the classification of that data message;

wherein the computer readable program code for mapping each of the data messages comprises computer readable program code for mapping each data message of the publish message type to an Unsolicited Grant Service (UGS) class, mapping each data message of the alert message type to a real-time Polling Service (rtPS) class, and mapping each data message of the management message type to a Best Effort (BE) or non-real-time Polling Service (nrtPS) class.

18. The tangible computer readable storage medium of claim 17, wherein the computer program further comprises computer readable program code for:

causing a first wireless node that is configured to execute the computer program to operate in a soft handoff mode with respect to multiple second wireless nodes so that the first wireless node communicates simultaneously with the second wireless nodes.

19. The tangible computer readable storage medium of claim 17, wherein the computer program further comprises computer readable program code for at least one of:

receiving one or more of the data message using a WiFi standard; and generating one or more of the data messages.

20. The tangible computer readable storage medium of claim 17, wherein the computer program further comprises computer readable program code for:

causing a wireless node that is configured to execute the computer program to operate as one of: a WiMAX subscriber station and a WiMAX base station.

* * * * *